United States Patent
Nakano (10) Patent No.: US 9,945,745 B2
(45) Date of Patent: Apr. 17, 2018

(54) ANOMALY DETERMINATION SYSTEM AND ANOMALY DETERMINATION METHOD

(71) Applicant: Hino Motors, Ltd., Tokyo (JP)

(72) Inventor: Hitoshi Nakano, Hino (JP)

(73) Assignee: HINO MOTORS, LTD., Tokyo (JP)

( * ) Notice: Subject to any disclaimer, the term of this patent is extended or adjusted under 35 U.S.C. 154(b) by 383 days.

(21) Appl. No.: 14/786,048

(22) PCT Filed: Jun. 17, 2014

(86) PCT No.: PCT/JP2014/066061
§ 371 (c)(1),
(2) Date: Oct. 21, 2015

(87) PCT Pub. No.: WO2015/001955
PCT Pub. Date: Jan. 8, 2015

(65) Prior Publication Data
US 2016/0103032 A1    Apr. 14, 2016

(30) Foreign Application Priority Data

Jul. 3, 2013 (JP) ................................. 2013-139650

(51) Int. Cl.
*G01L 13/00* (2006.01)
*F02D 41/22* (2006.01)
(Continued)

(52) U.S. Cl.
CPC .......... *G01L 13/00* (2013.01); *F02B 29/0493* (2013.01); *F02D 41/22* (2013.01);
(Continued)

(58) Field of Classification Search
CPC .. F02D 41/22; F02D 2200/0406; F02D 41/18; F02D 2200/0414; F02D 2200/703;
(Continued)

(56) References Cited

U.S. PATENT DOCUMENTS 8,327,695 B2 * 12/2012 Jackson ................ G01M 15/09
73/114.37
8,701,473 B2 * 4/2014 Uehara .............. B01D 46/0086
73/114.31
(Continued)

FOREIGN PATENT DOCUMENTS

JP    2001317415 A    11/2001
JP    2005188479 A     7/2005
(Continued)

OTHER PUBLICATIONS

English translation of the International Preliminary Report on Patentability dated Jan. 5, 2016 corresponding to PCT/JP2014/066061, ten pages.
(Continued)

*Primary Examiner* — Freddie Kirkland, III
(74) *Attorney, Agent, or Firm* — Kilpatrick Townsend & Stockton LLP (57) ABSTRACT

An anomaly determination system includes inlet and outlet pressure sensors for a pressure loss portion, an outside pressure sensor, and an anomaly determination section for determining an anomaly of the pressure loss portion. The anomaly determination section determines that the pressure loss portion is anomalous if the following two conditions are both met: a difference between the inlet pressure and the outlet pressure, a difference between the outlet pressure and the outside pressure, and a difference between the outside pressure and the inlet pressure which differences are detected when the flow rate is less than the minimum flow rate are all included in an allowable range; and a pressure difference between the inlet pressure and the outlet pressure when the flow rate is greater than or equal to the minimum flow rate is included in the first pressure loss range.

6 Claims, 6 Drawing Sheets

(51) Int. Cl.
*F02B 29/04* (2006.01)
*G01M 15/14* (2006.01)
*F02D 41/18* (2006.01)

(52) U.S. Cl.
CPC ............. *G01M 15/14* (2013.01); *F02D 41/18* (2013.01); *F02D 2200/0406* (2013.01); *Y02T 10/146* (2013.01); *Y02T 10/40* (2013.01)

(58) Field of Classification Search
CPC .......... F02D 2041/0265; G01M 15/05; G01M 15/106; G01M 15/09
See application file for complete search history.

(56) References Cited

U.S. PATENT DOCUMENTS

| | | | |
|---|---|---|---|
| 9,389,146 B2 * | 7/2016 | Saitou | ................. G01M 15/106 |
| 2008/0234919 A1 | 9/2008 | Ritter et al. | |
| 2009/0145111 A1 * | 6/2009 | Takahashi | ............ B01D 53/944 |
| | | | 60/277 |
| 2013/0036804 A1 * | 2/2013 | Uehara | ................. F02M 35/09 |
| | | | 73/114.31 |

FOREIGN PATENT DOCUMENTS

| | | |
|---|---|---|
| JP | 2006009598 A | 1/2006 |
| JP | 2007137374 A | 6/2007 |
| JP | 2008157200 A | 7/2008 |
| JP | 2013122182 A | 6/2013 |

OTHER PUBLICATIONS

European Search Report dated Nov. 23, 2016 corresponding to the European patent application, ten pages.
International Search Report dated Aug. 27, 2014 corresponding to PCT/JP2014/066061, two pages.

* cited by examiner

| Event | State of each pressure in low load |
|---|---|
| Anomaly in outlet pressure sensor (high) | $P_{OUT} > P_{atm} \fallingdotseq P_{IN}$ |
| Anomaly in outlet pressure sensor (low) | $P_{OUT} < P_{atm} \fallingdotseq P_{IN}$ |
| Anomaly in inlet pressure sensor (high) | $P_{IN} > P_{atm} \fallingdotseq P_{OUT}$ |
| Anomaly in inlet pressure sensor (low) | $P_{IN} < P_{atm} \fallingdotseq P_{OUT}$ |
| Anomaly in atmospheric pressure (high) | $P_{atm} > P_{IN} \fallingdotseq P_{OUT}$ |
| Anomaly in atmospheric pressure (low) | $P_{atm} < P_{IN} \fallingdotseq P_{OUT}$ |

| Event | Pressure loss | State of each pressure in low load |
|---|---|---|
| Intercooler is clogged | Large on high flow rate | $P_{atm} \fallingdotseq P_{IN} \fallingdotseq P_{OUT}$ |
| Anomaly in outlet pressure sensor (high) | Small or negative value | $P_{OUT} > P_{atm} \fallingdotseq P_{IN}$ |
| Anomaly in outlet pressure sensor (low) | Large on low flow rate | $P_{OUT} < P_{atm} \fallingdotseq P_{IN}$ |
| Anomaly in inlet pressure sensor (high) | Large on low flow rate | $P_{IN} > P_{atm} \fallingdotseq P_{OUT}$ |
| Anomaly in inlet pressure sensor (low) | Small or negative value | $P_{IN} < P_{atm} \fallingdotseq P_{OUT}$ |
| Anomaly in atmospheric pressure (high) | Normal | $P_{atm} > P_{IN} \fallingdotseq P_{OUT}$ |
| Anomaly in atmospheric pressure (low) | Normal | $P_{atm} < P_{IN} \fallingdotseq P_{OUT}$ |

ANOMALY DETERMINATION SYSTEM AND ANOMALY DETERMINATION METHOD

TECHNICAL FIELD

The present invention relates to an anomaly determination system and an anomaly determination method, which determine an anomaly of a pressure loss portion arranged in a fluid passage of a vehicle.

BACKGROUND ART

A pressure loss portion is arranged in an intake air passage or an exhaust gas passage of the engine, which is an example of a fluid passage. The pressure loss portion is arranged to cool intake air or purify exhaust gas while causing pressure loss by friction with fluid. An intercooler is one of such pressure loss portions and is arranged in a portion of the intake air passage that is located downstream of a supercharger, which supercharges intake air. The intercooler cools intake air of which the temperature has been increased by being pressurized.

If an anomaly such as clogging occurs in the pressure loss portion, the original function declines. Thus, devices and methods that detect an anomaly of the pressure loss portion have been proposed. As an example, a device is proposed that estimates an anomaly of a turbocharger and an anomaly of an intercooler from their temperatures (for example, refer to Patent Document 1). A sensor of the device detects a discharged air temperature, which is the temperature of a portion that is located upstream of the intercooler and between the turbocharger and the intercooler, and a temperature of a portion that is located downstream of the intercooler. Furthermore, the device calculates cooling efficiency from these temperatures and compares the calculated cooling efficiency with a map showing the cooling efficiency of the intercooler in a normal state. When the cooling efficiency declines to a value less than the normal value, the device determines that the intercooler is anomalous.

PRIOR ART DOCUMENT

Patent Document

Patent Document 1: Japanese Laid-Open Patent Publication No. 2005-188479

SUMMARY OF THE INVENTION

Problem that the Invention is to Solve

However, the aforementioned device estimates an anomaly of the intercooler on the assumption that all sensors are in normal states and does not anticipate a case in which an anomaly occurs in a sensor. Thus, the device may give an erroneous determination when an anomaly occurs in a sensor. Such a problem is not limited to the aforementioned device. A similar problem may also occur in a system having a pressure loss portion arranged in a fluid passage.

An object of the present invention is to increase the reliability of an anomaly determination system and an anomaly determination method that determine an anomaly of a pressure loss portion.

Means for Solving the Problems

One aspect of the present disclosure is an anomaly determination system including an inlet pressure sensor, an outlet pressure sensor, an outside pressure sensor, and an anomaly determination section. The inlet pressure sensor detects an inlet pressure of a pressure loss portion that is arranged in a fluid passage of a vehicle and causes pressure loss of fluid. The outlet pressure sensor detects an outlet pressure of the pressure loss portion. The outside pressure sensor detects an outside pressure, which is a pressure outside the fluid passage. The anomaly determination section determines an anomaly of the pressure loss portion. The anomaly determination section is configured to store a first pressure loss range indicative of pressure loss of the pressure loss portion in an anomalous state, determine whether a flow rate in the fluid passage is greater than or equal to a minimum flow rate at which the anomaly in the pressure loss portion is detectable, and determine that the pressure loss portion is anomalous if the following two conditions are both met: a difference between the inlet pressure and the outlet pressure, a difference between the outlet pressure and the outside pressure, and a difference between the outside pressure and the inlet pressure which differences are detected when the flow rate is less than the minimum flow rate are all included in an allowable range; and a pressure difference between the inlet pressure and the outlet pressure when the flow rate is greater than or equal to the minimum flow rate is included in the first pressure loss range.

Another aspect of the present invention is an anomaly determination method for determining an anomaly of a pressure loss portion, which is arranged in a fluid passage of a vehicle and causes pressure loss of fluid. The anomaly determination method includes detecting an inlet pressure of the pressure loss portion, an outlet pressure of the pressure loss portion, and an outside pressure, which is a pressure outside the fluid passage, determining whether a flow rate in the fluid passage is greater than or equal to a minimum flow rate at which the anomaly of the pressure loss portion is detectable, and determining that the pressure loss portion is anomalous if the following two conditions are both met: a difference between the inlet pressure and the outlet pressure, a difference between the outlet pressure and the atmospheric pressure, and a difference between the atmospheric pressure and the inlet pressure which differences are detected when the flow rate is less than the minimum flow rate are included in an allowable range; and a pressure difference between the inlet pressure and the outlet pressure when the flow rate is greater than or equal to the minimum flow rate is included in a first pressure loss range indicative of pressure loss in an anomalous state of the pressure loss portion.

According to the above aspects, an anomaly of the pressure loss portion is determined using the inlet and outlet pressures of the pressure loss portion and the outside pressure. When the flow rate in the fluid passage is a Low flow rate such that the flow rate is lower than the minimum flow rate, the inlet pressure, the outlet pressure, and the outside pressure are substantially equal to one another. Thus, it is possible to determine whether all the sensors are normal based on pressure differences among the inlet pressure, the outlet pressure, and the outside pressure. When the flow rate is a high flow rate, if the pressure difference of the pressure loss portion is included in the first pressure loss range under a condition in which all the sensors are normal, the pressure loss portion is determined to be anomalous, and the anomaly is confirmed. This increases the reliability of the anomaly determination result in the pressure loss portion.

EMBODIMENTS OF THE INVENTION

An anomaly determination system and an anomaly determination method according to one embodiment will now be described. In the present embodiment, the anomaly determination system is applied to the diesel engine of a vehicle provided with a supercharger.

Figure 1:
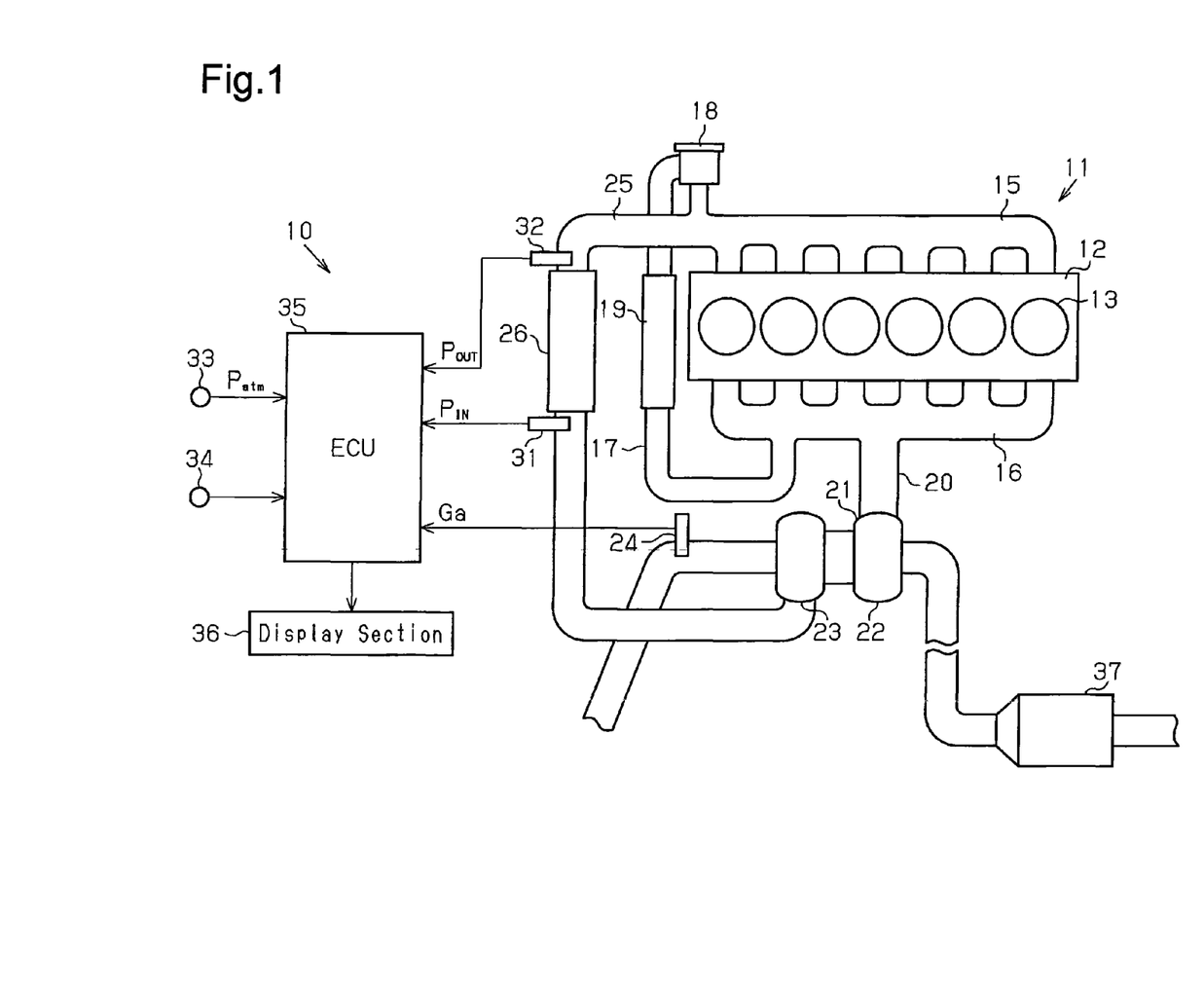
FIG. 1 is a schematic diagram of an anomaly determination system according to one embodiment.

As shown in FIG. 1, a cylinder head 12 of the engine 11 is coupled to an intake manifold 15, which communicates with the interior of cylinders 13, and an exhaust manifold 16. An exhaust gas recirculation (EGR) pipe 17 is coupled to the exhaust manifold 16, and some of the exhaust gas flows back to the intake manifold 15 through the EGR pipe 17. An EGR valve 18 is arranged in a portion of the EGR pipe 17 to adjust the amount of gas that flows back. An EGR cooler 19 is also arranged in the EGR pipe 17 to decrease the temperature of the exhaust gas that flows back.

An exhaust gas passage 20, which is located downstream of the exhaust manifold 16, is coupled to a turbine 22 of a turbocharger 21. The turbine wheel of the turbine 22 is coupled to a compressor wheel via a rotor shaft (neither is shown).

A compressor 23 is arranged in a portion of an intake air passage 25 that is located upstream of the intake manifold 15. An airflow meter 24 is also arranged in a portion of the intake air passage 25 that is located upstream of the compressor 23. The airflow meter 24 detects an intake air amount Ga, which is a mass flow rate.

An intercooler 26, which is a pressure loss portion, is arranged in a portion of the intake air passage 25 that is located downstream of the compressor 23. The intercooler 26 is, for example, an air-cooled cooling device and has core for cooling intake air. The core has tubes, fins, and the like. The intake air passes through the tubes. The fins and the tubes are alternately stacked. The intercooler 26 cools intake air delivered from the compressor 23 to increase the density of the intake air. If any of the tubes are clogged, the cooling efficiency declines and pressure loss increases.

An inlet pressure sensor 31 is arranged in a portion of the intake air passage 25 that is located upstream of the intercooler 26 and detects an inlet pressure $P_{IN}$ of the intercooler 26. An outlet pressure sensor 32 is arranged in a portion of the intake air passage 25 that is located downstream of the intercooler 26 and detects an outlet pressure $P_{OUT}$ of the intercooler 26. An atmospheric pressure sensor 33 is arranged at a location in the vehicle that enables the sensor to detect an atmospheric pressure Patm as an outside pressure.

An anomaly determination system 10 is a system for determining the presence or absence of an anomaly in the intercooler 26 and sensors 31-33. The system includes the inlet pressure sensor 31, the outlet pressure sensor 32, the atmospheric pressure sensor 33, and an ECU 35, which functions as an anomaly determination device (an anomaly determination section). The ECU 35 includes a CPU, a RAM, a ROM, and the like. The ECU 35 receives a measurement signal of an intake air amount Ga from the airflow meter 24 and receives an accelerator position signal from an accelerator position sensor 34 to calculate a fuel injection amount.

The ECU 35 further receives a measurement signal of the atmospheric pressure Patm from the atmospheric pressure sensor 33 as an outside pressure sensor. The ECU 35 receives a measurement signal of an inlet pressure $P_{IN}$ from the inlet pressure sensor 31 and receives a measurement signal of an outlet pressure $P_{OUT}$ from the outlet pressure sensor 32.

A diesel particulate filter (DPF) 37 is arranged in a portion of the exhaust gas passage 20 that is located downstream of the turbine 22. The DPF 37, which is formed of ceramics and a metal porous body, captures particulate matter (PM), which is contained in exhaust gas. The captured particulate matter is combusted in various types of regeneration processes.

When the ECU 35 confirms an anomaly of the intercooler or an anomaly of any of the sensors, the occurrence of the anomaly is displayed on a display section 36, such as a display or an indicator provided in the vehicle, to inform the driver of the anomaly.

Operation of the anomaly determination system 10 will now be described. The anomaly determination process is performed when a start condition is met, for example, when the ignition switch is turned on.

Figure 2:
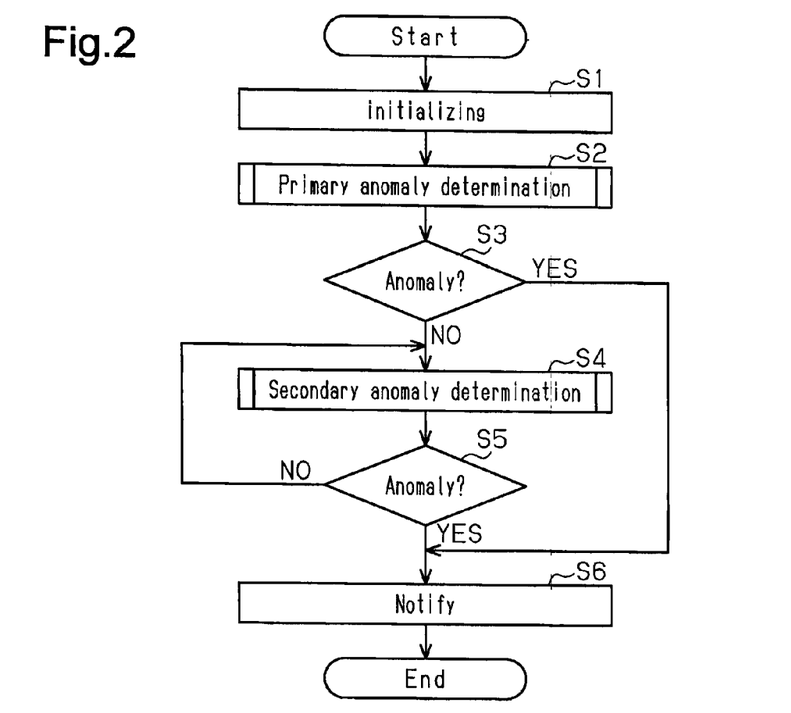
FIG. 2 is a flowchart of an anomaly determination process executed in the anomaly determination system of FIG. 1.

As shown in FIG. 2, when the anomaly determination process is started, the ECU 35 initializes various types of variables and various types of flags, which are temporarily stored in the RAM and the like and used in the anomaly determination (step S1). When the initialization is completed, the ECU 35 performs a primary anomaly determination (step S2). In the primary anomaly determination, the presence or absence of an anomaly is determined in the inlet pressure sensor 31, the outlet pressure sensor 32, and the atmospheric pressure sensor 33.

Figure 3:
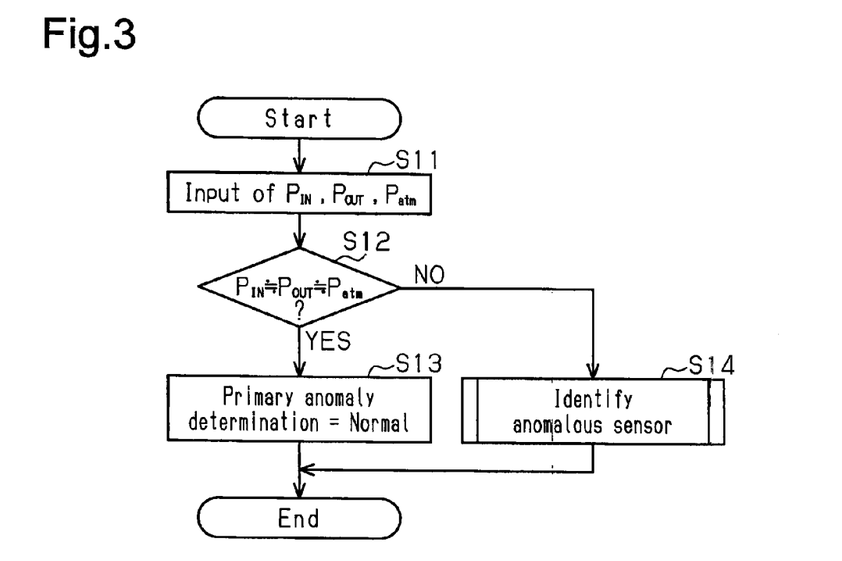
FIG. 3 is a flowchart of a primary anomaly determination, which is included in the anomaly determination process of FIG. 2.

The primary anomaly determination will now be described with reference to FIG. 3. The ECU 35 receives the inlet pressure $P_{IN}$, the outlet pressure $P_{OUT}$, and the atmospheric pressure Patm, which are output from the respective sensors 31-33 (step S11). The ECU 35 then determines whether the inlet pressure $P_{IN}$, the outlet pressure $P_{OUT}$, and the atmospheric pressure Patm are substantially equal to one another (step S12). In other words, since the compressor 23 is not driven in a state of no load at start of the engine, the inlet pressure $P_{IN}$, the outlet pressure $P_{OUT}$, and the atmospheric pressure Patm are supposed to be the same as one another if no anomaly is present in the sensors 31-33. However, in practice, fluctuation ranges exist due to various factors among the three detected values. Thus, the ECU 35 calculates the differences between any two pressures selected from the inlet pressure $P_{IN}$, the outlet pressure $P_{OUT}$, and the atmospheric pressure Patm and obtains the absolute values of the differences, $|P_{IN}-P_{OUT}|$, $|P_{OUT}-Patm|$, and $|P_{IN}-Patm|$. The ECU 35 then determines whether each of the absolute values is within a predetermined allowable width. The allowable width is fluctuation of the detected value in each of the sensors 31-33 in a normal state and defines an allowable range.

When the ECU 35 determines at step S12 that the absolute value of each difference is within the allowable width (YES at step S12), the ECU determines that each of the sensors 31-33 is normal in the primary anomaly determination (step S13).

When the ECU 35 determines that the absolute value of each difference exceeds the allowable width, that is, the inlet pressure $P_{IN}$, the outlet pressure $P_{OUT}$, and the atmospheric pressure Patm are not substantially the same as one another (NO at step S12), anomalous sensor identification is performed to identify a sensor in which an anomaly has occurred (step S14).

Figure 4:
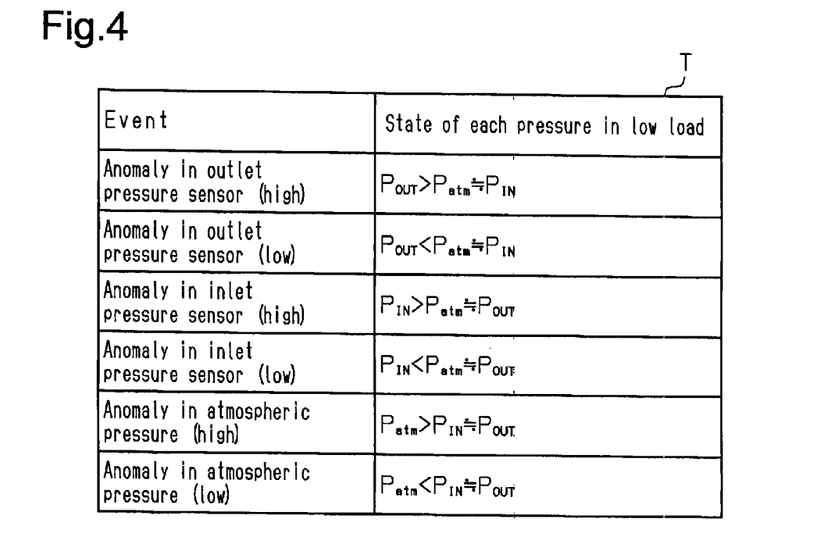
FIG. 4 is a table showing the relationship between anomalous parts and their pressures, which is used in the anomaly determination process of FIG. 2.

The anomalous sensor identification will now be described with reference to FIG. 4. The ECU 35 determines whether an excessively high value or an excessively low value is included in the detected values of the three sensors 31-33 as shown in a table T. In other words, when one of the three detected values is excessively high or low and the other two values are substantially the same, it is determined that an anomaly is occurring in the sensor that has output the excessively high or the excessively low value.

For example, the outlet pressure sensor 32 is determined to be anomalous when the outlet pressure $P_{OUT}$ is higher than the atmospheric pressure Patm and the inlet pressure $P_{IN}$, the absolute values of the difference between the outlet pressure $P_{out}$ and the atmospheric pressure Patm and the difference between the outlet pressure $P_{out}$ and the inlet pressure $P_{in}$ exceed the allowable width, and the absolute value of the difference between the atmospheric pressure Patm and the inlet pressure $P_{IN}$ is within the allowable width. In this case, the detected value of the outlet pressure sensor 32 is excessively high and tends to be excessive. In contrast, the outlet pressure sensor 32 is determined to be anomalous when the outlet pressure $P_{OUT}$ is lower than the atmospheric pressure Patm and the inlet pressure $P_{IN}$, the absolute values of the difference between the outlet pressure $P_{OUT}$ and the atmospheric pressure Patm and the difference between the outlet pressure $P_{OUT}$ and the inlet pressure $P_{IN}$ exceed the allowable width, and the absolute value of the difference between the atmospheric pressure Patm and the inlet pressure $P_{IN}$ is within the allowable width. In this case, the detected value of the outlet pressure $P_{OUT}$ is excessively low and tends to be undervalued.

Similarly, when the inlet pressure $P_{IN}$ is excessively higher or lower than the outlet pressure $P_{OUT}$ and the atmospheric pressure Patm, the inlet pressure sensor 31 is determined to be anomalous. When the atmospheric pressure Patm is excessively higher or lower than the inlet pressure $P_{IN}$ and the outlet pressure $P_{OUT}$, the atmospheric pressure sensor 33 is determined to be anomalous. In a case other than these cases, it is determined that two or more of the sensors 31-33 are likely to be anomalous.

As shown in FIG. 2, when the normal determination and the anomalous sensor identification are finished in the primary anomaly determination, the ECU 35 determines whether an anomaly is present (step S3). When the presence of an anomaly is determined (YES at step S3), the ECU 35 informs the driver of the occurrence of an anomaly by using the display section 36 (step S6). When an anomaly of a sensor is confirmed in the primary anomaly determination, anomaly determination of the intercooler 26 cannot be performed. Thus, the anomaly determination is finished. When the absence of an anomaly is determined (NO at step S3), the secondary anomaly determination is performed (step S4). The secondary anomaly determination is repeated unless a finishing condition of the anomaly determination is satisfied, or an anomaly determination is confirmed. The secondary anomaly determination is repeated at intervals of, for example, a few dozens of milliseconds to a few seconds.

The procedure of the secondary anomaly determination will now be described with reference to FIG. 6. First, the ECU 35 receives the intake air amount Ga from the airflow meter 24 (step S21). In consideration of fluctuation in the intake air amount Ga, the intake air amount Ga may be input on conditions that the variation of the engine speed is within a predetermined allowable width and the variation of the fuel injection amount is within a predetermined allowable width. Furthermore, the average of the intake air amount Ga within a predetermined period of time may be calculated.

The ECU 35 determines whether the intake air amount Ga is less than or equal to a reference mass flow rate Gth, which is used as a guide of a low flow rate condition (step S22). The reference mass flow rate Gth is the minimum intake air amount which is sufficient to detect clogging based on pressure loss of the intercooler 26. An example of the case in which the intake air amount Ga is less than or equal to the reference mass flow rate Gth is when fuel is not injected on start of the engine, or when no load is placed upon stopping of the vehicle.

When it is determined that the intake air amount Ga is less than or equal to the reference mass flow rate Gth (YES at step S22) on start of the engine, in a similar way to step S11 to step S12, the inlet pressure $P_{IN}$, the outlet pressure $P_{OUT}$, and the atmospheric pressure Patm are input (step S23), and it is determined whether those values are substantially the same as one another (step S24).

Immediately after the process moves from the primary anomaly determination to the secondary anomaly determination, the inlet pressure $P_{IN}$, the outlet pressure $P_{OUT}$, and the atmospheric pressure Patm are the same as one another in a normal state (YES at step S24). The ECU 35 determines whether an intercooler anomaly flag F1 is ON (step S25). The intercooler anomaly flag F1 is indicative of whether an anomaly is detected in pressure loss of the intercooler 26 on a high flow rate condition. When an anomaly is present in the pressure loss, the flag is set at ON. In the absence of an anomaly, the flag is set at OFF. Immediately after the procedure moves from the primary anomaly determination to the secondary anomaly determination, the intercooler anomaly flag F1 is in an initialized state (NO at step S25). This indicates that all the sensors 31-33 and the intercooler 26 are normal, and the current secondary anomaly determination is finished.

As shown in FIG. 2, when finishing the first round of the secondary anomaly determination, the ECU 35 determines whether an anomaly is determined in the secondary anomaly determination (step S5). When the absence of an anomaly is determined (NO at step S5), the secondary anomaly determination is repeated (step 4).

Figure 6:
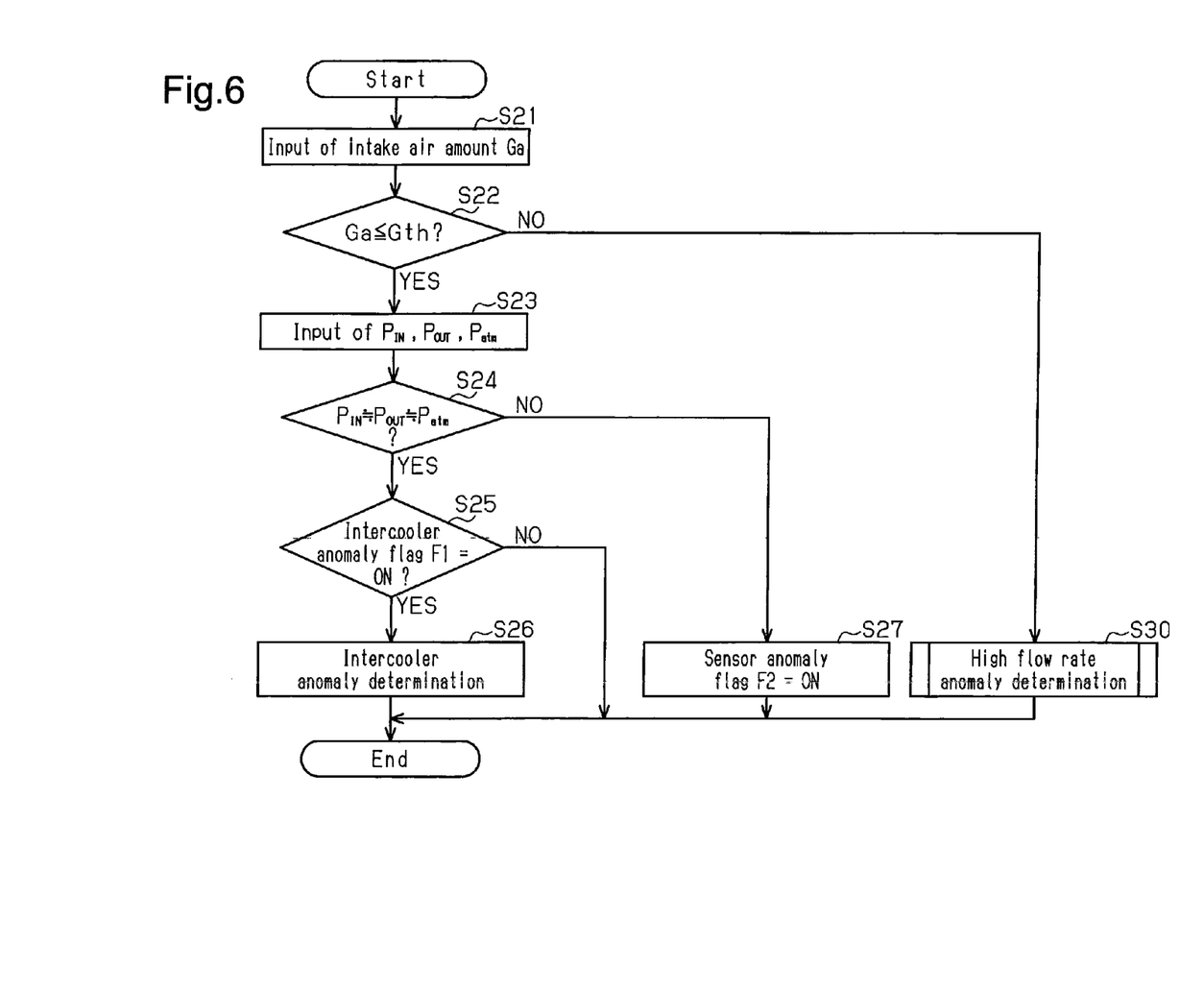
FIG. 6 is a flowchart of a secondary anomaly determination included in the anomaly determination process of FIG. 2.

As shown in FIG. 6, when the intake air amount Ga exceeds the reference mass flow rate Gth during execution of the secondary anomaly determination (NO at step S22), the procedure moves to step S30. At step S30, the secondary anomaly determination is performed on the high flow rate condition.

The secondary anomaly determination on the high flow rate condition will now be described with reference to FIG. 7. The ECU 35 receives the intake air amount Ga (step S31), as well as the inlet pressure $P_{IN}$ and the outlet pressure $P_{OUT}$ (step S32). The ECU 35 calculates the pressure difference ΔP by subtracting the outlet pressure $P_{OUT}$ from the inlet pressure $P_{IN}$ (step S33). The ECU 35 reads out an anomaly determination map 40 from the ROM or the like (step S34).

Figure 5:
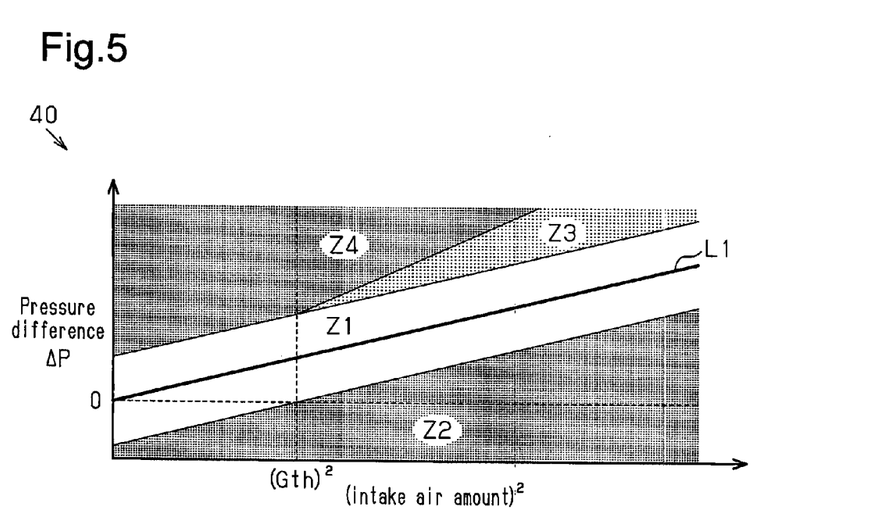
FIG. 5 is an anomaly determination map used in the anomaly determination process of FIG. 2.

In the anomaly determination map 40 shown in FIG. 5, the horizontal axis indicates the square value of the intake air amount Ga, which is a mass flow rate, and the vertical axis indicates the pressure difference ΔP, which is calculated at step S33. In the anomaly determination map 40, the straight line in which the pressure difference ΔP increases proportional to the square value of the intake air amount Ga has a normal pressure loss gradient L1 indicative of the pressure loss of the normal intercooler 26. The normal area Z1 is an area including a margin of variation relative to the normal pressure loss gradient L1.

A sensor anomaly area Z2 is an area in which the pressure difference ΔP is less than that of the normal area Z1. This area includes a state in which the inlet pressure sensor 31 is anomalous and its detected value is excessively low, and a state in which the outlet pressure sensor 32 is anomalous and its detected value is excessively high. In an intercooler anomaly area Z3, the pressure difference ΔP is higher than that of the normal area Z1 in a range in which the intake air amount Ga is greater than or equal to the reference mass flow rate Gth. The start point of the intake air amount in the intercooler anomaly area Z3 is the aforementioned reference mass flow rate Gth. Thus, an intercooler anomaly is determined only when the intake air amount Ga is greater than or equal to the reference mass flow rate Gth.

A sensor anomaly area Z4 is an area in which the mass flow rate (the intake air amount Ga) is lower than the reference mass flow rate Gth and the pressure difference ΔP is higher than that of the normal area Z1. In addition, the sensor anomaly area Z4 is an area in which the mass flow rate (intake air amount Ga) is greater than or equal to the reference mass flow rate Gth and the pressure difference ΔP is higher than that of the intercooler anomaly area Z3. This area includes a state in which the inlet pressure sensor 31 is anomalous and its detected value is excessively high, and a state in which the outlet pressure sensor 32 is anomalous and its detected value is excessively low.

Figure 7:
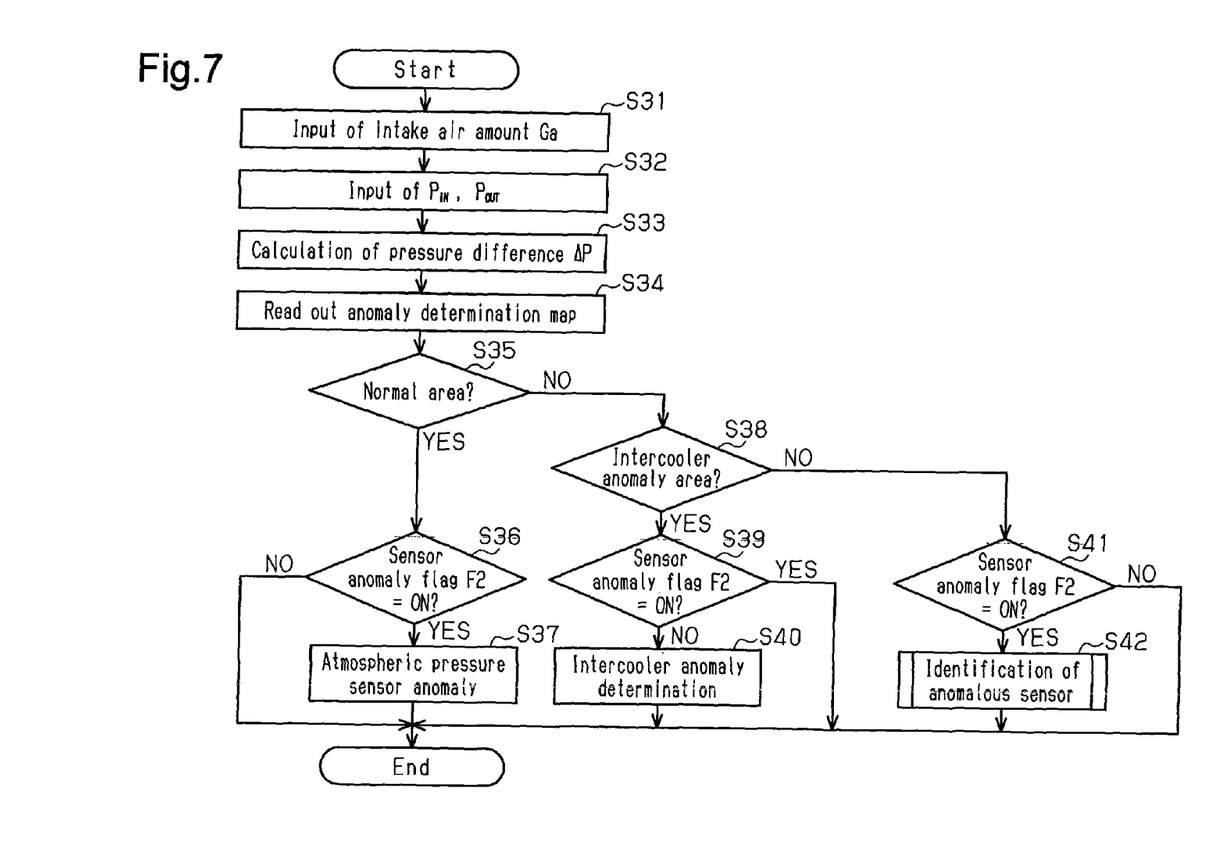
FIG. 7 is a flowchart of the secondary anomaly determination on a high flow rate condition in the secondary anomaly determination of FIG. 6, and included in the anomaly determination process of FIG. 2.

As shown in FIG. 7, the ECU 35 determines whether the pressure difference ΔP is included in the normal area Z1 based on the received intake air amount Ga and the pressure difference ΔP by using the anomaly determination map 40 (step S35). When it is determined that the pressure difference ΔP is included in the normal area Z1 (YES at step S35), the ECU 35 determines whether the sensor anomaly flag F2 is in an ON state (step S36). The sensor anomaly flag F2 is indicative of whether a sensor anomaly is detected on the low flow rate condition. In the presence of a sensor anomaly, the sensor anomaly flag F2 is set at ON. In the absence of a sensor anomaly, the sensor anomaly flag F2 is set at OFF.

When the ECU 35 determines at step S36 that the sensor anomaly flag F2 is OFF (NO at step S36), all the sensors 31-33 and the intercooler 26 are normal, and this round of the secondary anomaly determination is finished. The procedure moves to step S5.

When the ECU 35 determines at step S36 that the sensor anomaly flag F2 is ON (YES at step S36), the sensor is anomalous and the pressure difference ΔP is included in the normal area Z1. Thus, the ECU 35 determines that the inlet pressure sensor 31 and the outlet pressure sensor 32 are not anomalous and determines that the atmospheric pressure sensor 33 is anomalous (step S37). In this way, when an anomaly of the atmospheric pressure sensor 33 is confirmed, the procedure moves to step S5. The ECU 35 determines at step S5 the presence of an anomaly (YES at step S5) and informs the driver of occurrence of an anomaly in the atmospheric pressure sensor 33 (step S6).

When it is determined at step S35 that the pressure difference ΔP is not included in the normal area Z1 (NO at step S35), the ECU 35 determines whether the pressure difference ΔP is included in the intercooler anomaly area Z3 (step S38). When determining that the pressure difference ΔP is included in the intercooler anomaly area Z3 (YES at step S38), the ECU 35 determines whether the sensor anomaly flag F2 is ON (step S39).

When it is determined that the sensor anomaly flag F2 is set at OFF (NO at step S39), each of the sensors 31-33 is normal on the low flow rate condition, and the pressure loss in the intercooler 26 is included in the intercooler anomaly area Z3. Thus, since the pressure loss is correctly measured and an anomaly is detected, the presence of the anomaly in the intercooler 26 is confirmed (step S40). The procedure then moves to step S5. When it is determined that the sensor anomaly flag F2 is set at ON (YES at step S39) at step S39, a sensor anomaly may be present. Thus, the procedure returns to step S5 without confirming the intercooler anomaly, and the secondary anomaly determination is repeated.

As shown in FIG. 2, after an intercooler anomaly is confirmed, the ECU 35 determines that an anomaly is present at step S5 (YES at step S5) and informs the driver of the anomaly using the display section 36 (step S6).

As shown in FIG. 6, after start of the engine, if an anomaly occurs in the inlet pressure sensor 31 or the outlet pressure sensor 32, it is determined at step S24 that the inlet pressure $P_{IN}$, the outlet pressure $P_{OUT}$, the atmospheric pressure Patm are not the same as one another (NO at step S24). At this time, the ECU 35 sets the sensor anomaly flag F2 at ON (step S27).

As shown in FIG. 7, when an anomaly occurs in the inlet pressure sensor 31 or the outlet pressure sensor 32, in the process on the high flow rate condition, the pressure difference ΔP is not included in the normal area Z1 and the intercooler anomaly area Z3, but it is included in the sensor anomaly areas Z2 or Z4 (NO at step S35 and NO at step S38). In this case, the ECU 35 determines whether the sensor anomaly flag F2 is ON (step 41). In a case in which the sensor anomaly flag F2 has already been set at ON in the process on the low flow rate condition (YES at step S41), the anomalous sensor is identified in similar way to the primary anomaly determination at step S14 (step S42). In a case in which the sensor anomaly flag F2 is OFF (NO at step S41), the procedure moves to step S5, and the secondary anomaly determination is repeated. After the sensor anomaly flag F2 on the low flow rate condition is set at ON, an anomaly is confirmed in the inlet pressure sensor 31 and the outlet pressure sensor 32.

In this way, when an anomaly is confirmed in the inlet pressure sensor 31 or the outlet pressure sensor 32, the procedure moves to step S5, and the driver is informed of the sensor anomaly and the identified sensor (step S6). When a sensor anomaly is detected on the low flow rate condition and a sensor anomaly is detected on the high flow rate condition, the sensor anomaly is confirmed. This increases the reliability of an anomaly determination result in the sensor anomaly.

According to the above-illustrated embodiment, the following advantages are achieved.

(1) When the intake air amount Ga indicates a low flow rate in the intake air passage 25, the pressure upstream of the intercooler 26 and the pressure downstream of the intercooler 26 are substantially the same as each other. Thus, it can be determined whether each of the sensors 31-33 is normal according to whether the absolute value of the pressure difference of each set of two pressures selected from the inlet pressure $P_{IN}$, the outlet pressure $P_{OUT}$, and the atmospheric pressure Patm is included in the allowable width. Further, under a condition in which the intake air amount Ga is a high flow rate and the sensors 31-33 are normal, if the pressure difference ΔP in the intercooler 26 is included in the intercooler anomaly area Z3, which corresponds to a first pressure loss range, the intercooler 26 is determined to be anomalous, and the anomaly of the intercooler 26 is confirmed. This increases the reliability in the anomaly determination result of the intercooler 26.

(2) In the above-illustrated embodiment, the inlet pressure sensor 31 or the outlet pressure sensor 32 is determined to be anomalous when the following conditions are both met: on the low flow rate condition, the pressure difference of at least one of all sets of two pressures selected from the inlet pressure $P_{IN}$, the outlet pressure $P_{OUT}$, and the atmospheric pressure Patm is not included in the allowable width, that is, the inlet pressure $P_{IN}$, the outlet pressure $P_{OUT}$, and the atmospheric pressure Patm are not substantially equal to one another; and on the high flow rate condition, the pressure difference ΔP between the inlet pressure $P_{IN}$ and the outlet pressure $P_{OUT}$ is included in the sensor anomaly areas Z2 and Z4, which corresponds to the second pressure loss area. Thus, the anomaly in the inlet pressure sensor 31 or the outlet pressure sensor 32 can be determined in the same process as the process of determination of an anomaly in the intercooler 26. The sensor anomaly is confirmed when a sensor anomaly is detected on the low flow rate condition and a sensor anomaly is also detected on the high flow rate condition. This increases the reliability of an anomaly determination result in a sensor anomaly.

(3) In the above-illustrated embodiment, the atmospheric pressure sensor 33 is determined to be anomalous when the following conditions are both met: on the low flow rate condition, the pressure difference of at least one of all sets of two pressures selected from the inlet pressure $P_{in}$, the outlet pressure $P_{OUT}$, and the atmospheric pressure Patm is not included in the allowable width; and on the high flow rate condition, the pressure difference ΔP between the inlet pressure $P_{IN}$ and the outlet pressure $P_{OUT}$ is included in the normal area Z1, which corresponds to a normal pressure range. Thus, the anomaly of the atmospheric pressure sensor 33 can be determined in the same process as the process of determining an anomaly of the intercooler 26. The sensor anomaly is confirmed when a sensor anomaly is detected or, the low flow rate condition and the normal pressure loss is detected on the high flow rate condition. This increases the reliability of the anomaly determination result in a sensor anomaly.

(4) In the above-illustrated embodiment, among the inlet pressure $P_{IN}$, the outlet pressure $P_{OUT}$, and the atmospheric pressure Patm measured on the low flow rate condition, it is determined whether one of the pressures is excessively higher or lower than the other two pressure values. Thus, by comparing the inlet pressure, the outlet pressure, and the atmospheric pressure, the sensor with the excessively high or low detected pressure value is identified as a sensor in which an anomaly has occurred.

The above-illustrated embodiment may be carried out in modified manners listed below.

Figure 8:
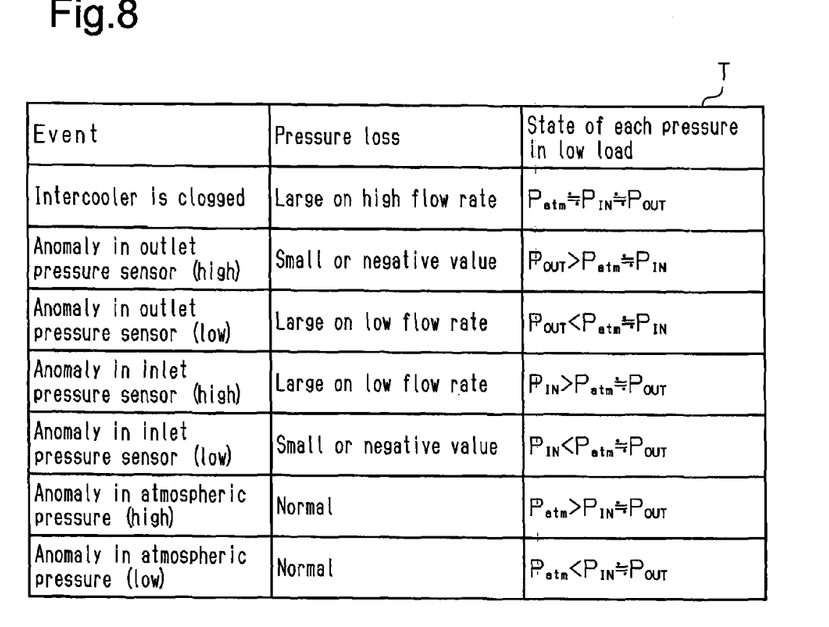
FIG. 8 is a table used in an anomaly determination process in a modification.

The anomaly determination system may use the table T as shown in FIG. 8 or a map in the anomaly determination process. The table T or the map associates the intake air amount Ga, the pressure loss of the intercooler 26, and the pressure values of the sensors 31-33 with an anomaly occurrence location. The anomaly determination system receives the intake air amount Ga, the pressure loss, and the pressure values of the sensors 31-33 at moment to moment. These values may be compared to the table T and the like so that the presence or absence of an anomaly and an anomaly occurrence location are determined.

In the anomaly determination process, depending on a condition which is whether or not the intake air amount Ga is greater than or equal to the reference mass flow rate Gth, determination based on pressure loss is performed, or it is determined whether the inlet pressure $P_{IN}$, the outlet pressure $P_{OUT}$, and the atmospheric pressure Patm are substantially equal to one another. However, the condition may be changed according to a fuel injection amount. For example, when the fuel injection amount is greater than or equal to a reference injection amount, determination is performed based on pressure loss of the intercooler 26. When the fuel injection amount is less than the reference injection amount, it is determined whether the inlet pressure $P_{IN}$, the outlet pressure $P_{OUT}$, and the atmospheric pressure Patm are equal to one another.

The anomaly determination process is configured not to move to the secondary anomaly determination when an anomaly is determined on the primary determination. However, the secondary anomaly determination may be performed in such a case.

The ECU 35 is configured to have a function of calculating the fuel injection amount Qfin. However, the ECU 35 may function only as an anomaly determination section.

In the anomaly determination process according to the embodiment, an anomaly of the intercooler 26 and anomalies of the sensors 31-33 are determined. However, if at least an anomaly of the intercooler 26 is detectable, other determination may be omitted. Alternatively, it may be determined that an anomaly has occurred in any of the sensors 31-33 without identifying the anomalous sensor.

The configuration of the engine 11 provided with the anomaly determination system 10 is not limited to a diesel engine. The engine 11 may be a gasoline engine. Moreover, the engine may be an engine without an EGR system.

The pressure loss portion may be a pressure loss portion other than the intercooler, which is arranged in a fluid passage of a vehicle. For example, the pressure loss portion may be an EGR cooler 19. In this configuration, the anomaly determination system has pressure sensors arranged upstream and downstream of the EGR cooler 19 in the EGR pipe 17. The pressure loss portion may be the DPF 37 or exhaust gas purification catalyst, which is arranged upstream of the DPF 37. Examples of the exhaust gas purification catalyst are an oxidation catalyst (not shown) and a selective reduction catalyst. When the pressure loss portion is an exhaust gas purification catalyst, the anomaly determination system 10 has pressure sensors, which are arranged upstream and downstream of the catalyst, which is subject to anomaly determination in the exhaust gas passage 20. Not limited to gas, the fluid may be liquid. For example, the fluid may be engine oil. The pressure loss portion may be an oil filter or an oil cooler, which is arranged in an oil circuit. The fluid may be coolant. The pressure loss portion may be a radiator. When the fluid is liquid, the "outside pressure" refers to the pressure of liquid outside the fluid passage, for example, the pressure of liquid in a tank or an oil pan.

The invention claimed is:

1. An anomaly determination system comprising:
an inlet pressure sensor for detecting an inlet pressure of a pressure loss portion that is arranged in a fluid passage of a vehicle and causes pressure loss of fluid;
an outlet pressure sensor for detecting an outlet pressure of the pressure loss portion;
an outside pressure sensor for detecting an outside pressure, which is a pressure outside the fluid passage; and
an anomaly determination section for determining an anomaly of the pressure loss portion, wherein
the anomaly determination section is configured to:
store a first pressure loss range indicative of pressure loss of the pressure loss portion in an anomalous state;
determine whether a flow rate in the fluid passage is greater than or equal to a minimum flow rate at which the anomaly in the pressure loss portion is detectable; and
determine that the pressure loss portion is anomalous if the following two conditions are both met:
a difference between the inlet pressure and the outlet pressure, a difference between the outlet pressure and the outside pressure, and a difference between the outside pressure and the inlet pressure which differences are detected when the flow rate is less than the minimum flow rate are all included in an allowable range, and
a pressure difference between the inlet pressure and the outlet pressure when the flow rate is greater than or equal to the minimum flow rate is included in the first pressure loss range.

2. The anomaly determination system according to claim 1, wherein the anomaly determination section is configured to:
store a normal pressure range, the first pressure loss range, and a second pressure loss range in a sensor anomalous state; and
determine that the inlet pressure sensor or the outlet pressure sensor is anomalous if the following two conditions are both met:
at least one of the difference between the inlet pressure and the outlet pressure, the difference between the outlet pressure and the outside pressure, and the difference between the outside pressure and the inlet pressure which differences are detected when the flow rate is less than the minimum flow rate is not included in the allowable range, and
the pressure difference between the inlet pressure and the outlet pressure which pressure difference is detected when the flow rate is greater than or equal to the minimum flow rate is included in the second pressure loss range.

3. The anomaly determination system according to claim 2, wherein the anomaly determination section is configured to determine that the outside pressure sensor is anomalous if the following two conditions are both met:
at least one of the difference between the inlet pressure and the outlet pressure, the difference between the outlet pressure and the outside pressure, and the difference between the outside pressure and the inlet pressure which differences are detected when the flow rate is less than the minimum flow rate is not included in the allowable range, and
the pressure difference between the inlet pressure and the outlet pressure which pressure difference is detected when the flow rate is greater than or equal to the minimum flow rate is included in the normal pressure range.

4. The anomaly determination system according to claim 1, wherein the anomaly determination section is configured to:
determine whether any one of the inlet pressure, the outlet pressure, and the outside pressure that are detected when the flow rate is less than the minimum flow rate has a pressure value that is excessive high or low in comparison to the other two pressure values; and
identify a sensor that has detected the excessive high or low pressure value as a sensor in which anomaly has occurred.

5. The anomaly determination system according to claim 1, wherein:
the fluid passage is an intake air passage or an exhaust gas passage of the engine of the vehicle,
the pressure loss portion, the inlet pressure sensor, and the outlet pressure sensor are arranged in the intake air passage or the exhaust gas passage, and
the anomaly determination section is configured to:
store the first pressure loss range, a second pressure loss range in a sensor anomalous state, and a normal pressure loss range, wherein the ranges each change according to an intake air amount; and
determine that the pressure loss portion is anomalous if the following two conditions are both met:
the difference between the inlet pressure and the outlet pressure, the difference between the outlet pressure and the outside pressure, and the difference between the outside pressure and the inlet pressure which differences are detected when the intake air amount is less than the minimum flow rate are included in the allowable range, and
the pressure difference between the inlet pressure and the outlet pressure when the intake air amount is greater than or equal to the minimum flow rate is included in the first pressure loss range corresponding to an intake air amount that is the same amount as the intake air amount.

6. An anomaly determination method for determining an anomaly of a pressure loss portion, which is arranged in a fluid passage of a vehicle and causes pressure loss of fluid, the anomaly determination method comprising:
detecting an inlet pressure of the pressure loss portion, an outlet pressure of the pressure loss portion, and an atmospheric pressure, which is a pressure outside the fluid passage;
determining whether a flow rate in the fluid passage is greater than or equal to a minimum flow rate at which an anomaly of the pressure loss portion is detectable; and
determining that the pressure loss portion is anomalous if the following two conditions are both met:
a difference between the inlet pressure and the outlet pressure, a difference between the outlet pressure and the atmospheric pressure, and a difference between the atmospheric pressure and the inlet pressure which differences are detected when the flow rate is less than the minimum flow rate are included in an allowable range, and
a pressure difference between the inlet pressure and the outlet pressure when the flow rate is greater than or equal to the minimum flow rate is included in a first pressure loss range indicative of pressure loss in an anomalous state of the pressure loss portion.

* * * * *